United States Patent
Branko et al.

(10) Patent No.: US 10,849,456 B2
(45) Date of Patent: Dec. 1, 2020

(54) BEVERAGE MACHINE WITH ERGONOMIC OUTLET

(71) Applicant: NESTEC S.A., Vevey (CH)

(72) Inventors: Lukic Branko, Menlo Park, CA (US); Etienne Crozier, La Neuveville (CH); Bertrand Guyon, Saint Point Lac (FR); Nicolas Obliger, Franey (FR); Steven Ryutaro Takayama, Menlo Park, CA (US); Jean-Luc Thuliez, Le Landeron (CH)

(73) Assignee: Societe des Produits Nestle S.A., Vevey (CH)

( * ) Notice: Subject to any disclaimer, the term of this patent is extended or adjusted under 35 U.S.C. 154(b) by 271 days.

(21) Appl. No.: 15/757,031

(22) PCT Filed: Sep. 2, 2016

(86) PCT No.: PCT/EP2016/070680
§ 371 (c)(1),
(2) Date: Mar. 2, 2018

(87) PCT Pub. No.: WO2017/037212
PCT Pub. Date: Mar. 9, 2017

(65) Prior Publication Data
US 2019/0059639 A1  Feb. 28, 2019

(30) Foreign Application Priority Data

Sep. 4, 2015 (WO) ................ PCT/US2015/048691

(51) Int. Cl.
*A47J 31/46* (2006.01)
*A47J 31/44* (2006.01)
(Continued)

(52) U.S. Cl.
CPC ............. *A47J 31/46* (2013.01); *A47J 31/407* (2013.01); *A47J 31/4403* (2013.01); *A47J 31/52* (2013.01); *A47J 31/4407* (2013.01)

(58) Field of Classification Search
CPC ........ A47J 31/46; A47J 31/4403; A47J 31/52; A47J 31/525; A47J 31/5255; A47J 31/407; A47J 31/4407; A47J 31/3633
See application file for complete search history.

(56) References Cited

U.S. PATENT DOCUMENTS 6,345,570 B1 * 2/2002 Santi ...................... A47J 31/368
                                                                99/289 R
9,907,431 B2 * 3/2018 Hansen ................. A47J 31/369
(Continued)

FOREIGN PATENT DOCUMENTS

CN  102639035 A  8/2012
CN  102905586 A  1/2013
(Continued)

OTHER PUBLICATIONS

Chinese Office Action for Appl No. 100034 dated Sep. 29, 2019.
(Continued)

*Primary Examiner* — Bayan Salone
(74) *Attorney, Agent, or Firm* — K&L Gates LLP

(57) ABSTRACT

A machine (1) for preparing and dispensing a beverage (2) comprises: —a main body (10) containing a unit (11,12,13, 14,15) for preparing said beverage (2) to be dispensed via an outlet (21) to an external user-recipient (3) at a user-recipient placement location (30); —a beverage dispensing head (20) that includes the outlet (21) and that is movable relative to the main body (10) inwards into the main body (10) into a retracted head position and outwards from the main body (10) into a deployed head position; and—a control unit (16) for controlling the preparation unit (11,12,13,14,15) to supply said beverage (2) to the outlet (21). The control unit (16)
(Continued)

is configured to: —maintain or leave the beverage dispensing head (20) in its retracted position when the beverage preparation unit (11,12,13,14,15) is not operated to process a liquid; and/or—move the beverage dispensing head (20) into its deployed position or maintain or leave it in this position only when the control unit (16) operates the preparation unit (11,12,13,14,15) to process a liquid for dispensing via the outlet (21).

16 Claims, 3 Drawing Sheets

(51) Int. Cl.
*A47J 31/40* (2006.01)
*A47J 31/52* (2006.01)

(56) References Cited

U.S. PATENT DOCUMENTS

| | | | |
|---|---|---|---|
| 10,007,397 B2* | 6/2018 | Besson | G06F 3/0482 |
| 2013/0047863 A1* | 2/2013 | Larzul | A47J 31/3633 |
| | | | 99/295 |
| 2013/0112085 A1* | 5/2013 | Turchi | A47J 31/4489 |
| | | | 99/300 |
| 2013/0160653 A1* | 6/2013 | McCormick | A47J 31/061 |
| | | | 99/281 |
| 2013/0239819 A1 | 9/2013 | Giua et al. | |
| 2013/0247771 A1 | 9/2013 | Maisch | |
| 2013/0247772 A1* | 9/2013 | Agon | A47J 31/4403 |
| | | | 99/285 |
| 2015/0040771 A1* | 2/2015 | Mori | A47J 31/3633 |
| | | | 99/295 |
| 2015/0082989 A1* | 3/2015 | Besson | G06F 3/0482 |
| | | | 99/280 |
| 2015/0135962 A1* | 5/2015 | Jarisch | A47J 31/4492 |
| | | | 99/280 |
| 2015/0238045 A1* | 8/2015 | Hansen | A47J 31/369 |
| | | | 99/295 |

FOREIGN PATENT DOCUMENTS

| | | |
|---|---|---|
| CN | 102946775 A | 2/2013 |
| EP | 2789278 | 10/2014 |
| JP | 2008501379 A | 1/2008 |
| JP | 2013519443 A | 5/2013 |
| JP | 2015509802 A | 4/2015 |

OTHER PUBLICATIONS

Japan Patent Office Communication for Application No. 2018-508157, Dispatch No. 289154, Dispatch dated Jul. 21, 2020, 3 pages.

* cited by examiner

BEVERAGE MACHINE WITH ERGONOMIC OUTLET

CROSS REFERENCE TO RELATED APPLICATIONS

The present application is a National Stage of International Application No. PCT/EP2016/070680, filed on Sep. 2, 2016, which claims priority to International Application No. PCT/US2015/048691, filed on Sep. 4, 2015, the entire contents of which are being incorporated herein by reference.

FIELD OF THE INVENTION

The field of the invention pertains to beverage preparation machines provided with an ergonomic beverage outlet, e.g. machines using capsules of an ingredient of the beverage to be prepared.

For the purpose of the present description, a "beverage" is meant to include any human-consumable liquid substance, such as tea, coffee, hot or cold chocolate, milk, soup, baby food, etc. . . . . . A "capsule" is meant to include any pre-portioned beverage ingredient, such as a flavouring ingredient, within an enclosing packaging of any material, in particular an airtight packaging, e.g. plastic, aluminium, recyclable and/or biodegradable packagings, and of any shape and structure, including soft pods or rigid cartridges containing the ingredient. The capsule may contain an amount of ingredient for preparing a single beverage portion or a plurality of beverage portions.

BACKGROUND ART

Certain beverage preparation machines use capsules containing ingredients to be extracted or to be dissolved and/or ingredients that are stored and dosed automatically in the machine or else are added at the time of preparation of the drink. Some beverage machines possess filling means that include a pump for liquid, usually water, which pumps the liquid from a source of water that is cold or indeed heated through heating means, e.g. a thermoblock or the like.

Especially in the field of coffee preparation, machines have been widely developed in which a capsule containing beverage ingredients is inserted in a brewing device. The brewing device is tightly closed about the capsule, water is injected at the first face of the capsule, the beverage is produced in the closed volume of the capsule and a brewed beverage can be drained from a second face of the capsule and collected into a receptacle such as a cup or glass.

Brewing devices have been developed to facilitate insertion of a "fresh" capsule and removal of the capsule upon use. Typically, the brewing devices comprise two parts relatively movable from a configuration for inserting/removing a capsule to a configuration for brewing the ingredient in the capsule.

The actuation of the movable part of the brewing device may be manual as disclosed in WO 2009/043630, WO 01/15581, WO 02/43541, WO 2010/015427, WO 2010/128109, WO 2011/144719 and WO 2012/032019. Various handle configurations are disclosed in EP 1867260, WO 2005/004683, WO WO2007/135136, WO 2008/138710, WO 2009/074550, WO 2009/074553, WO 2009/074555, WO 2009/074557, WO 2009/074559, WO 2010/037806, WO 2011/042400, WO 2011/042401 and WO 2011/144720. Integrations of such arrangements into beverage machines are disclosed in WO 2009/074550, WO2011/144719, EP2014195046, EP2014195048 and EP2014195067.

The actuation of the movable part of the brewing device may be motorized. Such a system is for example disclosed in EP 1 767 129. In this case, the user does not have to provide any manual effort to open or close the brewing device. The brewing device has a capsule insertion passage provided with a safety door assembled to the movable part of the brewing device via a switch for detecting an undesired presence of a finger in the passage during closure and prevent injuries by squeezing. Alternative covers for a capsule insertion passage are disclosed WO 2012/093107 and WO 2013/127906. Different motorization systems are disclosed in WO 2012/025258, WO 2012/025259 and WO 2013/127476.

For allowing the user to interact with such machines, for providing operation instructions to the machine or obtaining feed-back therefrom, various systems have been disclosed in the art, for instance as mentioned in the following references: AT 410 377, CH 682 798, DE 44 29 353, DE 202 00 419, DE 20 2006 019 039, DE 2007 008 590, EP 1 448 084, EP 1 676 509, EP 08155851.2, FR 2 624 844, GB 2 397 510, U.S. Pat. Nos. 4,377,049, 4,458,735, 4,554,419, 4,767,632, 4,954,697, 5,312,020, 5,335,705, 5,372,061, 5,375,508, 5,645,230, 5,685,435, 5,731,981, 5,836,236, 5,959,869, 6,182,555, 6,354,341, 6,759,072, US 2007/0157820, WO 97/25634, WO99/50172, WO 2004/030435, WO 2004/030438, WO 2006/063645, WO 2006/090183, WO 2007/003062, WO 2007/003990, WO 2008/104751, WO 2008/138710, WO 2008/138820, WO 2010/003932, WO 2011/144720 and WO 2012/032019.

WO 2006/050881 discloses a milk frother that has a dispensing head for dispensing the frother milk. The dispensing head is retractable inside the frother's housing for the time needed at the end of a dispensing cycle to perform a cleaning cycle of the dispensing head.

SUMMARY OF THE INVENTION

The invention relates to a machine for preparing a beverage. The beverage preparation machine can be an in-home or out of home machine. The machine may be for the preparation of coffee, tea, chocolate, cacao, milk, soup, baby food, etc.

The beverage preparation typically includes the mixing of a plurality of beverage ingredients, e.g. water and milk powder, and/or the infusion of a beverage ingredient, such as an infusion of ground coffee or tea with water. One or more of such ingredients may be supplied in loose and/or agglomerate powder form and/or in liquid form, in particular in a concentrate form. A carrier or diluents liquid, e.g. water, may be mixed with such ingredient to form the beverage. Typically, a predetermined amount of beverage is formed and dispensed on user-request, which corresponds to a portion (e.g. a serving). The volume of such portion may be in the range of 25 to 200 ml and even up to 300 or 400 ml, e.g. the volume for filling a cup, depending on the type of beverage. Formed and dispensed beverages may be selected from ristrettos, espressos, lungos, cappuccinos, latte macchiato, café latte, americano coffees, teas, etc. . . . . . In particular, a coffee machine may be configured for dispensing espressos, e.g. an adjustable volume of 20 to 60 ml per portion, and/or for dispensing lungos, e.g. a volume in the range of 70 to 150 ml per portion.

The machine of the invention has a main body containing a unit for preparing the beverage to be dispensed via an outlet to an external user-recipient at a user-recipient placement location. The beverage preparation unit may include a flow circuit with at least one of: a source of liquid e.g. water; a liquid sensor e.g. a flowmeter; a pump for driving a liquid from a or said source to the outlet, e.g. a solenoid pump (reciprocating piston pump) or a peristaltic pump or a diaphragm pump; and a thermal fluid conditioner such as a heater and/or a cooler.

The thermal conditioner may be a boiler or a thermoblock or an on demand heater (ODH), for instance an ODH type disclosed in EP 1 253 844, EP 1 380 243 and EP 1 809 151.

Examples of pumps and their incorporation into beverage machines are disclosed in WO 2009/150030, WO 2010/108700, WO 2011/107574 and WO 2013/098173.

The placement location can be associated with a machine recipient support for supporting such user-recipient under the outlet. The support can be: associated with a drip tray e.g. a drip tray supporting the support; and/or movable relative to the housing vertically under the outlet and/or away from under the outlet for enabling a placement of user-recipients of different heights under the outlet. Examples of suitable recipient supports are disclosed in EP 0 549 887, EP 1 440 639, EP 1 731 065, EP 1 867 260, U.S. Pat. Nos. 5,161,455, 5,353,692, WO 2009/074557, WO 2009/074559, WO 2009/135869, WO 2011/154492, WO 2012/007313, WO 2013/186339, EP 2014198712, EP 2014198710 and EP 2014198715.

The machine of the invention has a beverage dispensing head that includes the outlet and that is movable relative to the main body:

inwards into the main body into a retracted head position; and outwards from the main body into a deployed head position.

The user-recipient placement location can be located vertically below the outlet when the head is in its deployed position.

The machine of the invention has a control unit for controlling the preparation unit to supply the beverage to the outlet.

For instance, the control unit is connected to a user-interface. The user-interface can be located on the dispensing head and movable therewith.

Hence, the user-interface can be part of the movable dispensing head and is thus deployed when the dispensing head is moved into its deployed position (typically in view of preparing and dispensing a beverage or servicing the beverage preparation unit) and is retracted when the dispensing head is moved into its retracted position (typically in the absence of preparing and dispensing a beverage or servicing the beverage preparation unit). The user-interface is thus linked to the movement of the dispensing head and brought forward in front of the machine with the or a visually prominent machine part and thus immediately brought to the user's attention when the user-interface is likely to be needed. Such a configuration thus enhances the user convenience resulting from the positioning of the user-interface in view of an expected high use or reduced use or non-use thereof.

For instance, the user-interface includes an apparent user-interface that is accessible to a user when the head is in the deployed position and that remains accessible to a user when the head is in its retracted position. The apparent user-interface can be configured to receive user-instructions when the beverage preparation unit is not in operation. The apparent user-interface may be configured to receive user-instructions when the beverage preparation unit is in operation. Such an apparent user-interface can be used both when the dispensing head is in its deployed position (e.g. for setting beverage preparation parameters and/or requesting a beverage preparation and dispensing, or for setting servicing parameters and/or for requesting a servicing of the beverage preparation unit) and when the dispensing head is in its retracted position (e.g. for powering the machine, e.g. to start-up the machine from a switched off or a standby mode, or for entering a beverage preparation or servicing mode).

The user-interface may include a retractable user-interface that is: retracted in the main body when the head is in its retracted position; and deployed out of the main body when the head is in its deployed position. Thereby, the retractable user-interface is accessible to a user in the deployed position and inaccessible (or hidden) to a user in the retracted position. The retractable user-interface can be configured to receive user-instructions when the beverage preparation unit is in operation, such as an user-instruction to interrupt operation (e.g. to request a beverage preparation and dispensing or servicing of the machine, or to interrupt such beverage preparation and dispensing or service of the machine). Typically, the retractable user-interface is configured to not receive any user-instruction when in the retracted position.

The outlet can be confined in the main body when the beverage dispensing head is in its retracted position.

In accordance with the invention, the control unit is configured to:

maintain or leave the beverage dispensing head in its retracted position when the beverage preparation unit is not operated to process a liquid such as the beverage or a cleaning liquid; and/or move the beverage dispensing head into its deployed position or maintain or leave it in this position only when the control unit operates the preparation unit to process a liquid for dispensing via the outlet.

It follows that the beverage dispensing head is not moved from its retracted position into deployed position unless it is for operating the beverage preparation unit to prepare a beverage or process other liquids.

The machine can be configured to deploy its beverage dispensing head only when the machine is operating to prepare beverage or process other liquids (e.g. in a cleaning or descaling cycle) to be dispensed via the dispensing head's outlet. The remaining time, especially when the machine is not in activity, the machine can be left in a compact state with the beverage dispensing head retracted.

The control unit is typically configured to operate the preparation unit to prepare the beverage when the beverage dispensing head is in its deployed position.

The control unit can be configured to operate the preparation unit to service the unit when the beverage dispensing head is in its deployed position. The servicing can involve a descaling program, such as a descaling with a volume of descaling water corresponding to a plurality of plurality of beverage portions delivered via the outlet to a service recipient at said placement location.

The control unit may be configured to operate the preparation unit to evacuate residual beverage when the beverage dispensing head is in its deployed position or when it is in its retracted position or when it is moved to the deployed position or when it is moved to the retracted position. Therefor the preparation unit can be operated for rinsing the outlet, such as a rinsing with a volume of rinsing water corresponding to a single beverage portion or less delivered via the preparation unit to a waste collector, e.g. a waste collector located in main body and optionally removable therefrom.

The beverage dispensing head can be moved into its retracted position in at least one of the following instances:
- immediately at the end of servicing the beverage preparation unit;
- immediately at the end of preparing a portion of beverage by the beverage preparation unit or after a short period of time after the end, such as a period of time in the range of 1 to 15 sec, such as 3 to 12 sec, e.g. 5 to 10 sec, the beverage dispensing head being for instance maintained in its deployed position upon preparing a portion of beverage to allow during such short period of time a user to request the preparation of a further portion of beverage by the preparation unit; and
- in the absence of a detection by a sensor connected to the control unit of a user-recipient in the placement location, the sensor being for instance an optical or a proximity sensor.

The beverage dispensing head can be moved into its deployed position:
- on a user-request of a beverage preparation or of a servicing of the preparation unit; and/or
- on a detection by a sensor connected to the control unit of a user-recipient in the placement location, the sensor being for instance an optical or a proximity sensor.

The beverage preparation unit can have an ingredient mixing module which comprises a first part and a second part that are relatively movable, e.g. by a motor, between a mixing position for mixing ingredients and a transfer position for inserting an ingredient and/or removing waste (e.g. residual or waste ingredient(s)) from the mixing module. For instance, the module is in fluid connection with a source of liquid such as water. The source of liquid can be connected to the module via one or more of: a liquid sensor such as a flowmeter, a pump for driving a liquid from the source to the module and then the outlet, and a thermal fluid conditioner such as a heater and/or a cooler.

Examples of suitable mixing modules with first and second parts that are relatively moved by a motor are disclosed in EP 1767129, WO 2012/025258, WO 2012/025259, WO 2013/127476 and WO 2014/056641.

For instance, the first part and the second part of the mixing module are relatively movable generally along a longitudinal straight axis.

Typically, the first and second parts of the mixing module are distant from each other in the transfer position and close to each other in the mixing position. In the mixing position, the first and second parts may define a mixing chamber, e.g. a chamber for receiving a plurality of beverage ingredients to be mixed together. In one embodiment, the mixing chamber is an infusion chamber in which infusible ingredients, e.g. coffee or tea, are exposed to a carrier liquid, such as water e.g. hot water. The mixing chamber may be configured to receive loose solid ingredient particles and/or to receive proportioned ingredients within a capsule.

At least one part of the first and second parts may delimit a cavity for receiving the ingredient e.g. within a capsule, such as a tapered cavity, e.g. a conical or pyramidal cavity, or a straight cavity, e.g. a cylindrical or trapezoidal cavity. Such cavity may extend along an axis that is generally collinear with the above longitudinal straight axis.

The other part of these first and second parts may include an extraction plate, such as a plate provided with piercing elements for opening a flow-through face of the capsule or a non-intrusive plate for cooperating with a pre-opened or a self-opening flow-through face of the capsule.

Self-opening capsules are for instance disclosed in CH 605 293 and WO 03/059778.

The opening of capsules by a machine's piercing elements of a plate are for example disclosed in EP 512 470 and EP 2 068 684.

Examples of suitable mixing modules with mixing chambers are disclosed in WO 2008/037642 and WO 2013/026843.

A flavoured beverage may be prepared by circulating (by means of a liquid driver, e.g. a pump) a carrier liquid, such as water, into the capsule to flavour the liquid by exposure to a flavouring ingredient held in the capsule, e.g. along an extraction direction that may be generally parallel to the direction of relative movement of the first and second parts of the mixing module.

When closed capsules are used, the first and second parts may include a capsule opener such as blades and/or a tearing tool, e.g. a plate with a tearing profile, for instance as known from Nespresso™ machines or as disclosed in EP 0 512 470, EP 2 068 684 and WO 2014/076041 and the references cited therein.

The beverage dispensing head can be mechanically connected or linked, e.g. via a cam arrangement and/or a gear arrangement such as a spur and/or friction gear arrangement, to one of the first and second part that is movable in the main body so that the dispensing head is moved into:
- its deployed position when the first and second parts are relatively moved into the mixing position; and
- its retracted position when the first and second parts are relatively moved into the transfer position.

Hence, a common actuator, e.g. a single motor, can drive the dispensing head and the said one of the first and second parts relative to the main body. In such a case, the said one of the first and second parts can be moved: simultaneously with the dispensing head; or can be moved sequentially or partly sequentially (and partly simultaneously) after or before moving the dispensing head.

The said one of the first and second part can form an upstream part or a downstream part of the mixing module.

The beverage dispensing head and the said one of the first and second parts can be mechanically disconnectable, e.g. via a connection actuator controlled by the control unit such as a magnetic actuator, so as to allow a relative movement of the first and second parts without moving the dispensing head.

The beverage dispensing head in the deployed position and the said one of the first and second parts in the mixing position can be mechanically disconnected to relatively move the first and second parts back and forth between the mixing position and the transfer position when a user requests the preparation of a further portion of beverage by the preparation unit:
- before the end of preparing a portion of beverage by the preparation unit; or
- within a short period of time after the end of preparing a portion of beverage by the preparation unit, such as a period of time in the range of 1 to 15 sec, such as 3 to 12 sec, e.g. 5 to 10 sec.

Hence, a user can request the dispensing of two (or more) portions of beverages into the same user-recipient without moving the dispensing head into its retracted position while reloading the mixing unit.

The control unit can be configured to disconnect the dispensing head in its retracted position from the said one of the first and second parts to relatively move the first and second parts into the mixing position, e.g. to unclog the mixing module or to rinse the mixing module such as a rinsing with a volume of rinsing water corresponding to a single beverage preparation or less delivered via the preparation unit to a waste collector, and then to relatively move the first and second parts back into the transfer position, e.g. a waste collector located in the main body and optionally removable therefrom.

The main body typically has a transfer channel for supplying an ingredient to the mixing module, e.g. the main body comprises or delimits such a transfer channel. The channel may extend to a waste collector, e.g. a waste collector located in the main body and optionally removable therefrom.

The interaction between the first and second parts (and optionally the transfer channel) and an ingredient capsule may be of the type disclosed in WO 2005/004683, WO 2007/135135, WO2007/135136, WO 2008/037642 and WO 2013/026856.

The machine may include a capsule loader associated with the transfer channel for loading a capsule.

The capsule to be loaded may be of the type described above under the title "Field of the Invention" and/or the capsule may include an ingredient described under the same title.

The capsule can comprise a capsule body, e.g. a generally straight or tapered body. The capsule can have a circular peripheral annulus flange, e.g. a flexible or rigid flange, extending from a peripheral part, e.g. an edge or face, of the capsule body. The capsule may contain a flavoring ingredient for preparing tea, coffee, hot chocolate, cold chocolate, milk, soup or baby food.

The capsule loader may have: a capsule holding configuration for holding an ingredient capsule away from the mixing module; and a capsule releasing configuration for releasing the capsule in or into the transfer channel towards the mixing module.

The loader may have a capsule gate that is movable, such as pivotable and/or translatable, between a position obstructing the transfer channel for preventing a passage of the capsule along the channel and a position clearing the transfer channel for allowing a passage of the capsule along the channel.

Immediately after releasing a capsule to the mixing module, the loader may be passed from the releasing configuration to the holding configuration so that the transfer channel is opened only when needed to release a capsule.

The loader can have a shape complementary to a shape of the capsule.

The loader may have an actuator for passing from the holding configuration to the releasing configuration and vice versa, such as an actuator controlled by the control unit.

Details of suitable capsule loaders are disclosed in WO 2012/126971, WO 2014/056641, WO 2014/056642 and WO 2015/086371.

The loader may have a capsule sensor for sensing a presence of a capsule on the capsule loader and optionally sensing a type of the capsule. The capsule loader can be controlled by the control unit to automatically release a sensed capsule when the mixing module is in the transfer position. When a particular type of capsule is identified, the control unit may adapt the control of the preparation unit of the beverage according to the identified type.

Details of suitable capsule sensing are disclosed in WO 2012/123440, WO 2014/147128, PCT/EP15/060555, PCT/EP15/060561, PCT/EP15/060567, PCT/EP15/065415 and PCT/EP15/065535.

Advantageously, the machine has a directing fluid guide upstream the outlet and downstream the preparation unit, the directing guide being configured to direct residual liquid from the preparation unit to a waste collector when the preparation unit is not operated to process a beverage, e.g. a waste collector located in the main body and optionally removable therefrom. The directing fluid guide, the outlet and the preparation unit can be configured so that the directing fluid guide directs liquid from the preparation unit: in a dispensing configuration to the outlet when the dispensing head is in its deployed position; and in a collecting configuration to the waste collector when the dispensing head is in its retracted position.

The directing fluid guide can have a guide inlet in fluid connection with the preparation unit so that the guide inlet is:
   directly connected to the preparation unit, the directing fluid guide having a guide outlet or draining edge that is in fluidic communication selectively with the dispensing head outlet or with the waste collector; or
   separate from the preparation unit, the directing fluid guide having:
      a collecting surface, e.g. a channel of funnel, for collecting liquid flowing from an outlet of the preparation unit, e.g. of a mixing module of the preparation unit; and
      at least one guide outlet or draining edge for directing the liquid collected by the collecting surface to the dispensing head outlet and/or to the waste collector, such as: a single guide outlet or draining edge for directing the liquid selectively to the head outlet or to the waste collector; or a first guide outlet or draining edge for draining the liquid to the head outlet and a second guide outlet or draining edge for directing the liquid to the waste collector.

The directing fluid guide can be actuated between the dispensing configuration and the collecting configuration by an actuator controlled by the control unit.

The directing fluid guide can be entirely confined in the main body and/or the dispensing head.

Details of directing fluid guides that are suitable or adaptable for carrying out the present invention are disclosed in WO 2006/050769, WO 2012/072758, WO 2013/127907 and EP2014195067.5.

The directing guide and the dispensing head may be mechanically connected, e.g. by a cam arrangement and/or a gear arrangement such as a spur and/or friction gear arrangement, so that the movement of the dispensing head:
   from its retracted position into its deployed position is linked to or causes or is caused by a relative movement of the directing device into the dispensing configuration to direct fluid to the outlet; and/or
   from its deployed position into its retracted position is linked to or causes or is caused by a relative movement of the directing device into the collecting configuration to direct fluid to the waste collector.

The dispensing head can be configured to translate along a straight direction from the retracted position into the deployed position and vice versa. For instance, the beverage preparation unit has an ingredient mixing module which comprises a first part and a second part that are relatively movable generally along this straight direction between a mixing position for mixing ingredients and a transfer position for inserting an ingredient and/or removing waste from the mixing module. The ingredient mixing module may be of the type described above.

The dispensing head may be configured to move:
   inwards into an outside housing or frame of the main body into the retracted position; and
   outwards of the outside housing or frame into a deployed position.

For instance, the dispensing head in the retracted position has an outside face, e.g. a front face, that is flush, e.g. entirely flush, with the outside housing or frame. Hence, the dispensing head in the retracted position can be entirely sunk into main body.

Examples of suitable waste collectors for carrying out the present invention are disclosed in EP 1867260, WO 2009/074559, WO 2009/135869, WO 2010/128109, WO 2011/086087 and WO 2011/086088.

BRIEF DESCRIPTION OF THE DRAWINGS

The invention will now be described with reference to the schematic drawings, wherein.

DETAILED DESCRIPTION

FIGS. 1 to 6 illustrate an exemplary embodiment of a beverage machine 1 in accordance with the invention. The ingredient may be supplied in the form of an ingredient capsule 4, e.g. of the type described above under the header "Field of the Invention". The sequence from FIG. 1 to FIG. 6 illustrates a beverage preparation sequence in machine 1 from the supply of an ingredient, e.g. an ingredient capsule 4, to the removal of the used ingredient, e.g. capsule 4, upon beverage preparation.

Figure 1:
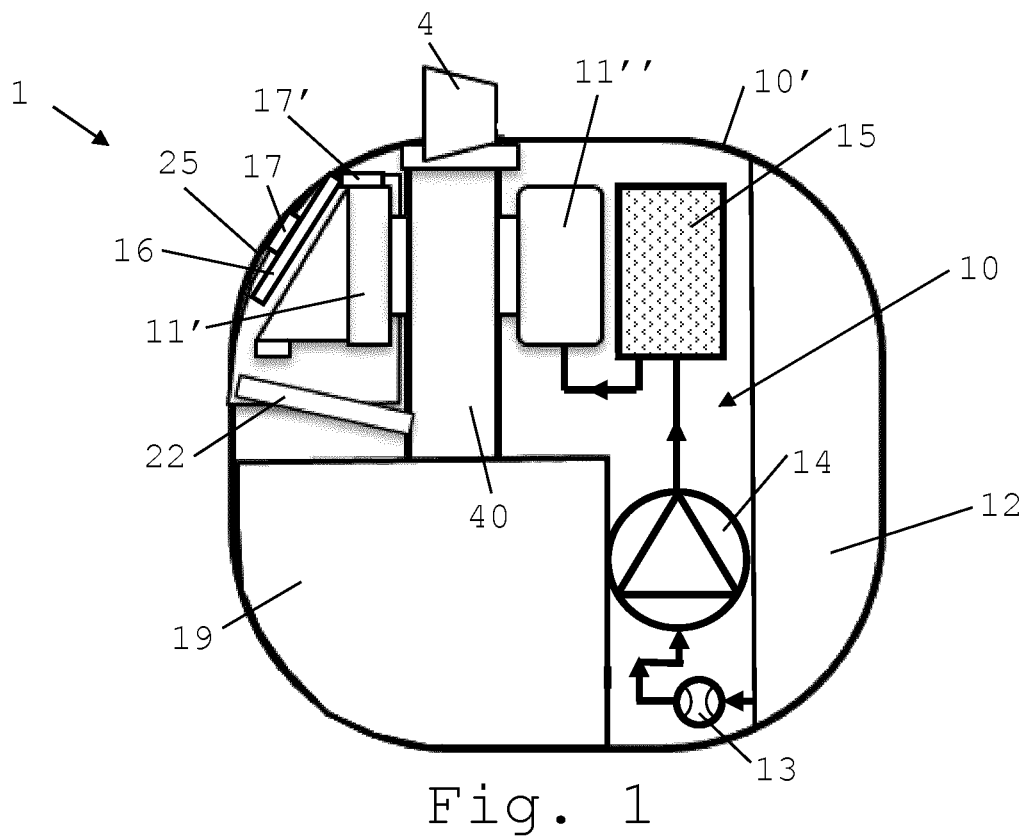
FIG. 1 schematically illustrates a machine according to the invention having a beverage preparation unit with an ingredient mixing module in a transfer position and an ingredient capsule on a loader for being transferred to the mixing module.

Machine 1 has a main body 10 containing a unit 11,12,13,14,15 for preparing beverage 2 to be dispensed via an outlet 21 to an external user-recipient 3 at a user-recipient placement location 30. For instance, beverage preparation unit 11,12,13,14,15 comprises a flow circuit with at least one of: a source 12 of liquid e.g. water, a liquid sensor 13 e.g. a flowmeter, a pump 14 for driving a liquid from a or said source 12 to the outlet 21, and a thermal fluid conditioner 15 such as a heater and/or a cooler, as illustrated in FIG. 1.

Figure 3:
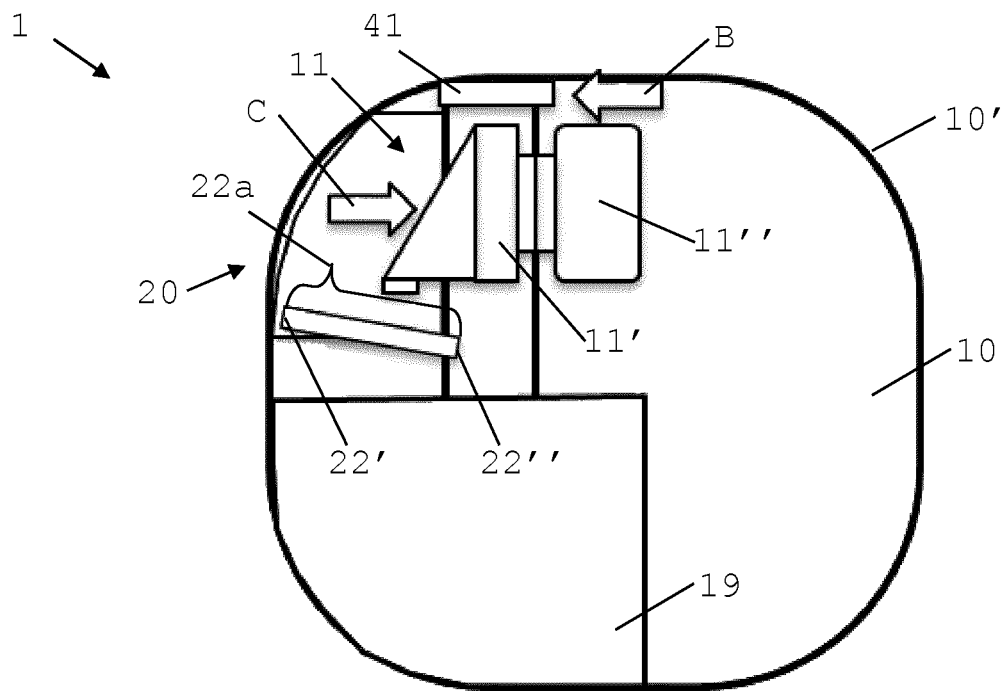
FIG. 3 schematically illustrates the machine of FIG. 1 with the ingredient mixing module in the mixing position and the beverage dispensing head in the retracted position prior to beverage dispensing.
Figure 4:
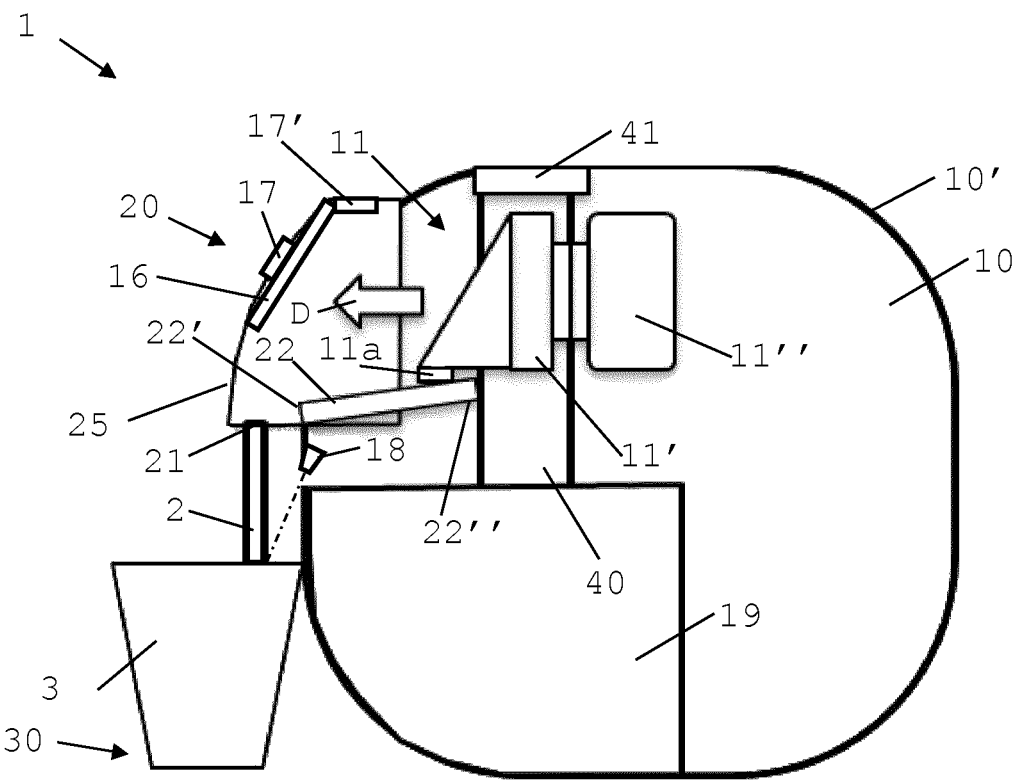
FIG. 4 schematically illustrates the machine of FIG. 1 with the beverage dispensing head in the deployed position for dispensing via the head's outlet a beverage to a user-recipient.

Machine 1 has a beverage dispensing head 20 that includes outlet 21 and that is movable relative to main body 10 inwards into main body 10 into a retracted head position (FIGS. 1, 2, 3, 5 and 6) and outwards from main body 10 into a deployed head position (FIG. 4). For instance, user-recipient placement location 30 is located vertically below outlet 21 when head 20 is in its deployed position. See FIG. 4.

Figure 5:
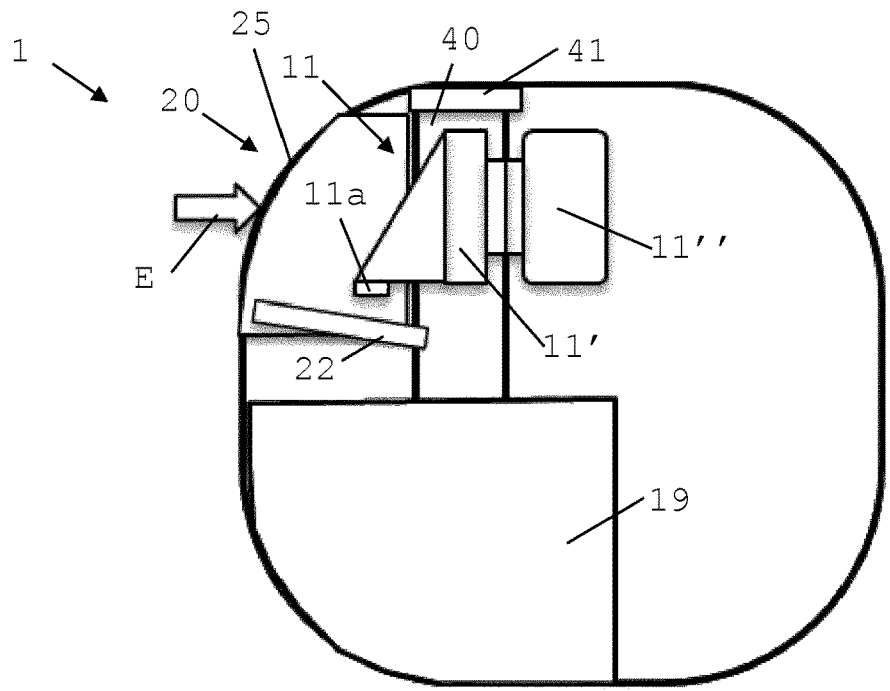
FIG. 5 schematically illustrates the machine of FIG. 1 with the dispensing head in the retracted position after beverage dispensing.

Arrow D in FIG. 4 illustrates the movement of dispensing head 20 into the deployed position. Arrow E in FIG. 5 illustrates the movement of dispensing head 20 into the retracted position.

Machine 1 includes a control unit 16 for controlling preparation unit 11,12,13,14,15 to supply beverage 2 to outlet 21. For instance, control unit 16 is connected to a user-interface 17,17', such as a user-interface 17,17' located on dispensing head 20 and movable therewith, e.g. a user-interface 17 that remains accessible to a user when head 20 is in its retracted position and/or a user-interface 17' that is accessible to a user in the deployed position and inaccessible (or hidden) to a user in the retracted position. See FIGS. 1 and 4.

Outlet 21 can be confined in main body 10 when beverage dispensing head 20 is in its retracted position. See FIGS. 1, 2, 3, 5 and 6.

Control unit 16 is configured to:
 maintain or leave beverage dispensing head 20 in its retracted position when beverage preparation unit 11,12,13,14,15 is not operated to process a liquid such as beverage 2; and/or
 move beverage dispensing head 20 into its deployed position or maintain or leave it in this position only when control unit 16 operates preparation unit 11,12,13,14,15 to process a liquid for dispensing via outlet 21.

Control unit 16 is typically configured to operate preparation unit 11,12,13,14,15 to prepare beverage 2 when beverage dispensing head 20 is in its deployed position.

Control unit 16 may be configured to operate preparation unit 11,12,13,14,15 to service unit 11,12,13,14,15 when beverage dispensing head 20 is in its deployed position, for instance to carry out a descaling program, such as a descaling with a volume of descaling water corresponding to a plurality of beverage portions delivered via outlet 21 to a service recipient at said placement location 30.

Control unit 16 may be configured to operate preparation unit 11,12,13,14,15 to evacuate residual beverage when beverage dispensing head 20 is in its deployed position or when it is in its retracted position or when it is moved to the deployed position or when it is moved to the retracted position. For instance, preparation unit 11,12,13,14,15 is operated for rinsing outlet 21, such as a rinsing with a volume of rinsing water corresponding to a single beverage portion or less delivered via preparation unit 11,12,13,14,15 to a waste collector 19, e.g. a waste collector 19 located in main body 10 and optionally removable therefrom.

Beverage dispensing head 20 may be moved into its retracted position in at least one of the following instances:
 immediately at the end of servicing beverage preparation unit 11,12,13,14,15;
 immediately at the end of preparing a portion of beverage by beverage preparation unit 11,12,13,14,15 or after a short period of time after the end, such as a period of time in the range of 1 to 15 sec, such as to 12 sec, e.g. 5 to 10 sec, optionally beverage dispensing head 20 being maintained in its deployed position upon preparing a portion of beverage to allow during this short period of time a user to request the preparation of a further portion of beverage by preparation unit 11,12,13,14,15; and
 in the absence of a detection by a sensor 18 connected to control unit 16 of a user-recipient 3 in placement location 30, optionally sensor 18 being an optical or a proximity sensor (FIG. 4).

Beverage dispensing head 20 can be moved into its deployed position: on a user-request of a beverage preparation or of a servicing of the preparation unit 11,12,13,14,15; and/or on a detection by a sensor 18 connected to control unit 16 of a user-recipient 3 in placement location 30, optionally sensor 18 being an optical or a proximity sensor.

Beverage preparation unit 11,12,13,14,15 can have an ingredient mixing module 11 which comprises a first part 11' and a second part 11" that are relatively movable, e.g. by a motor, between a mixing position for mixing ingredients and a transfer position for inserting an ingredient 4 and/or removing waste from the mixing module 11. For instance, module 11 is in fluid connection with source 12 of liquid such as water, such as a source 12 of liquid connected to module 11 via one or more of: a liquid sensor 13 such as a flowmeter, a pump 14 for driving a liquid from source 12 to module 11 and then outlet 21, and a thermal fluid conditioner 15 such as a heater and/or a cooler. See FIG. 1.

Figure 6:
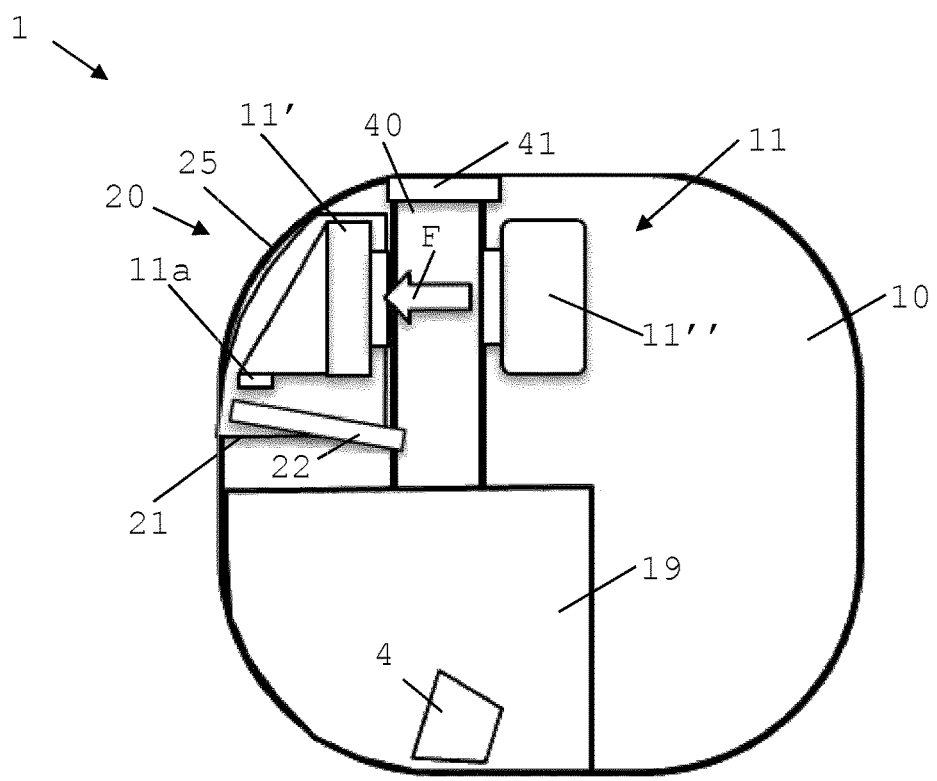
FIG. 6 schematically illustrates the machine of FIG. 1 with the mixing module in the transfer position after beverage dispensing whereby the ingredient capsule is transferred to a waste collector.

Arrow C in FIG. 3 illustrates the relative movement of first and second parts 11',11" into the mixing position. Arrow F in FIG. 6 illustrate the relative movement of first and second parts 11',11" into the transfer position.

Beverage dispensing head 20 can be mechanically connected or linked, e.g. via a cam arrangement and/or gear arrangement such as a spur and/or friction gear arrangement, to one 11' of first and second parts 11',11" that is movable in main body 10 so that dispensing head 20 is moved into: its deployed position when first and second parts 11',11" are relatively moved into the mixing position; and its retracted position when first and second parts 11',11" are relatively moved into the transfer position.

For instance, said one 11' of first and second parts 11',11" forms an upstream part or a downstream part 11' of mixing module 11.

Beverage dispensing head 20 and said one 11' of first and second parts 11',11" can be mechanically disconnectable, e.g. via a connection actuator controlled by the control unit 16 such as a magnetic actuator, so as to allow a relative movement of first and second parts 11',11" without moving dispensing head 20.

For instance, beverage dispensing head 20 in the deployed position and said one 11' of first and second parts 11',11" in the mixing position can be mechanically disconnected to relatively move first and second parts 11',11" back and forth between the mixing position and transfer position when a user requests the preparation of a further portion of beverage 2 by preparation unit 11,12,13,14,15: before the end of preparing a portion of beverage 2 by preparation unit 11,12,13,14,15; or within a short period of time after the end of preparing a portion of beverage 2 by preparation unit 11,12,13,14,15, such as a period of time in the range of 1 to 15 sec, such as 3 to 12 sec, e.g. 5 to 10 sec.

Control unit 16 can be configured to disconnect dispensing head 20 in its retracted position from said one 11' of first and second parts 11',11" to relatively move first and second parts 11',11" into the mixing position, e.g. to unclog mixing module 11 or to rinse mixing module 11 such as a rinsing with a volume of rinsing water corresponding to a single beverage preparation or less delivered via preparation unit 11,12,13,14,15 to a waste collector 19, and then to relatively move first and second parts 11',11" back into the transfer position, e.g. a waste collector 19 located in main body 10 and optionally removable therefrom.

Main body 10 can have a transfer channel 40 for supplying an ingredient 4 to mixing module 11. Channel may extend to a waste collector 19, e.g. a waste collector 19 located in main body 10 and optionally removable therefrom.

Machine 1 can include a capsule loader 41 associated with transfer channel 40 for loading a capsule 4.

Capsule 4 can have a body, e.g. a generally straight or tapered body and optionally a circular peripheral annulus flange, e.g. a flexible or rigid flange, extending from a peripheral part, e.g. an edge or face, of the body.

Capsule 4 may contain a flavoring ingredient for preparing tea, coffee, hot chocolate, cold chocolate, milk, soup or baby food.

Capsule loader 41 can have: a capsule holding configuration for holding a capsule 4 away from mixing module 11; and a capsule releasing configuration for releasing the capsule in or into transfer channel 40 towards the mixing module 11.

Loader 41 may have a capsule gate 41 that is movable, such as pivotable and/or translatable, between a position obstructing transfer channel 40 for preventing a passage of capsule 4 along channel 40 and a position clearing transfer channel 40 for allowing a passage of capsule 4 along the channel 40.

Figure 2:
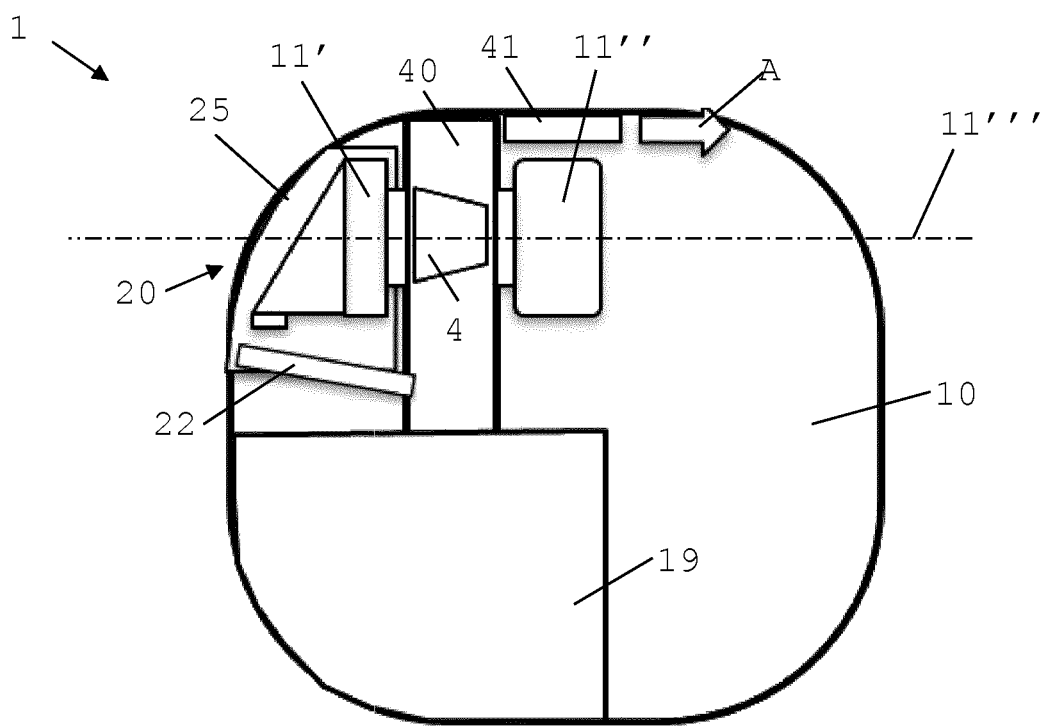
FIG. 2 schematically illustrates the machine of FIG. 1 upon release by the loader of the ingredient capsule to the mixing module.

Arrow A in FIG. 2 indicates the passage from the holding configuration to the releasing configuration. Arrow B in FIG. 3 indicates the passage from the holding configuration to the releasing configuration.

Immediately after releasing capsule 4 to mixing module 11, loader 41 may be passed from the releasing configuration to the holding configuration so that transfer channel 40 is opened only when needed to release a capsule 4.

Loader 41 can have a shape complementary to a shape of capsule 4.

Loader 41 may have an actuator for passing from the holding configuration to the releasing configuration and vice versa, such as an actuator controlled by control unit 16.

Loader 41 can have a capsule sensor for sensing a presence of a capsule 4 on capsule loader 41 and optionally sensing a type of the capsule. For instance, capsule loader 41 is controlled by control unit 16 to automatically release a sensed capsule 4 when mixing module 11 is in the transfer position.

Machine 1 may include a directing fluid guide 22 upstream outlet 21 and downstream preparation unit 11,12, 13,14,15, directing guide 22 being configured to direct residual liquid from preparation unit 11,12,13,14,15 to a waste collector 19 when preparation unit 11,12,13,14,15 is not operated to process a beverage 2, e.g. a waste collector 19 located in the main body 10 and optionally removable therefrom. Outlet 21 and preparation unit 11,12,13,14,15 may be configured so that directing guide 22 directs liquid from preparation unit 11,12,13,14,15:
    in a dispensing configuration to outlet 21 when dispensing head 20 is in its deployed position; and
    in a collecting configuration to the waste collector when dispensing head 20 is in its retracted position.

Directing fluid guide 22 can have a guide inlet in fluid connection with preparation unit 11,12,13,14,15 so that the guide inlet is:
    directly connected to the preparation unit, the directing fluid guide having a guide outlet or draining edge that is in fluidic communication selectively with the dispensing head outlet or with the waste collector; or
    separate from the preparation unit 11,12,13,14,15, the directing fluid guide having:
        a collecting surface 22a, e.g. a channel of funnel, for collecting liquid 2 flowing from an outlet 11a of preparation unit 11,12,13,14,15, e.g. of a mixing module 11 of preparation unit 11,12,13,14,15; and at least one guide outlet or draining edge 22',22" for directing liquid collected by collecting surface 22a to dispensing head outlet 21 and/or to waste collector 19, such as: a single guide outlet or draining edge for directing such liquid selectively to head outlet or to the waste collector; or a first guide outlet or draining edge 22' for draining such liquid to head outlet 21 and a second guide outlet or draining edge 22" for directing such liquid to waste collector 19.

Directing fluid guide 22 can be actuated between the dispensing configuration and the collecting configuration by an actuator controlled by control unit 16.

Directing fluid guide 22 may be entirely confined in main body 10 and/or dispensing head 20.

Directing guide 22 and dispensing head 20 can be mechanically connected, e.g. by a cam arrangement and/or a gear arrangement such as a spur and/or friction gear arrangement, so that the movement of the dispensing head 20:

from its retracted position into its deployed position is linked to or causes or is caused by a relative movement of directing device 22 into the dispensing configuration to direct fluid to outlet 21; and/or from its deployed position into its retracted position is linked to or causes or is caused by a relative movement of directing device 22 into the collecting configuration to direct fluid to waste collector 19.

Dispensing head 20 can be configured to translate along a straight direction 11''' (FIG. 2) from the retracted position into the deployed position and vice versa. For instance, beverage preparation unit 11,12,13,14,15 has a or the above ingredient mixing module 11 which comprises first part 11' and second part 11" that are relatively movable generally along straight direction 11''' between a mixing position for mixing ingredients and a transfer position for inserting an ingredient 4 and/or removing waste from mixing module 11.

Dispensing head 20 may be configured to move inwards into an outside housing or frame 10' of main body 10 into retracted position and outwards of outside housing or frame 10' into a deployed position. For instance, dispensing head 20 in the retracted position has an outside face 25, e.g. a front face 25, that is flush, e.g. entirely flush, with outside housing or frame 10'.

The invention claimed is:

1. A machine for preparing and dispensing a beverage comprising:
    a main body containing a preparation unit for preparing the beverage to be dispensed via an outlet to an external user-recipient at a user-recipient placement location;
    a beverage dispensing head that includes the outlet and that is movable relative to the main body inwards into the main body into a retracted head position and outwards from the main body into a deployed head position;
    a control unit for controlling the preparation unit to supply the beverage to the outlet; and
    the control unit is configured to:
    maintain or leave the beverage dispensing head in its retracted position when the preparation unit is not operated to process a liquid, the control unit configured to operate the preparation unit to prepare the beverage when the beverage dispensing head is in its deployed position; and/or
    move the beverage dispensing head into its deployed position or maintain or leave it in this position only when the control unit operates the preparation unit to process a liquid for dispensing via the outlet.

2. The machine of claim 1, wherein the control unit is configured to operate the preparation unit to service the preparation unit when the beverage dispensing head is in its deployed position.

3. The machine of claim 1, wherein the control unit is configured to operate the preparation unit to evacuate residual beverage when the beverage dispensing head is in its deployed position or when it is in its retracted position or when it is moved to the deployed position or when it is moved to the retracted position.

4. The machine of claim 1, wherein the beverage dispensing head is configured to move into its retracted position in an instance selected from the group consisting of:
    immediately at the end of servicing the beverage preparation unit;
    immediately at the end of preparing a portion of beverage by the preparation unit or after a short period of time after the end; and
    in the absence of a detection by a sensor connected to the control unit of a user-recipient in the placement location.

5. The machine of claim 1, wherein the beverage dispensing head is configured to move into its deployed position:
    on a user-request of a beverage preparation or of a servicing of the preparation unit; and/or
    on a detection by a sensor connected to the control unit of a user-recipient in the placement location.

6. The machine of claim 1, wherein the preparation unit has an ingredient mixing module which comprises a first part and a second part that are relatively movable.

7. The machine of claim 6, wherein the beverage dispensing head is mechanically connected or linked to one of the first and second parts that is movable in the main body so that the dispensing head is moved into:
    its deployed position when the first and second parts are relatively moved into the mixing position; and
    its retracted position when the first and second parts are relatively moved into the transfer position.

8. The machine of claim 7, wherein the beverage dispensing head and the one of the first and second parts are mechanically disconnectable so as to allow a relative movement of the first and second parts without moving the dispensing head.

9. The machine of claim 8, wherein the beverage dispensing head in the deployed position and the one of the first and second parts in the mixing position are mechanically disconnected to relatively move the first and second parts back and forth between the mixing position and the transfer position when a user requests the preparation of a further portion of beverage by the preparation unit:
    before the end of preparing a portion of beverage by the preparation unit; or
    within a short period of time after the end of preparing a portion of beverage by the preparation unit.

10. The machine of claim 8, wherein the control unit is configured to disconnect the dispensing head in its retracted position from the one of the first and second parts to relatively move the first and second parts into the mixing position and then to relatively move the first and second parts back into the transfer position.

11. The machine of claim 6, wherein the main body has a transfer channel for supplying an ingredient to the mixing module, the channel.

12. The machine of claim 11, which comprises a capsule loader associated with the transfer channel for loading a capsule,
the capsule loader having:
a capsule holding configuration for holding a capsule away from the mixing module; and
a capsule releasing configuration for releasing the capsule in or into the transfer channel towards the mixing module.

13. The machine of claim 1, comprising a directing fluid guide upstream the outlet and downstream the preparation unit, the directing guide being configured to direct residual liquid from the preparation unit to a waste collector when the preparation unit is not operated to process a beverage.

14. The machine of claim 13, wherein the directing guide and the dispensing head are mechanically connected so that the movement of the dispensing head:
from its retracted position into its deployed position is linked to or causes or is caused by a relative movement of the directing device into the dispensing configuration to direct fluid to the outlet; and/or
from its deployed position into its retracted position is linked to or causes or is caused by a relative movement of the directing device into the collecting configuration to direct fluid to the waste collector.

15. The machine of claim 1, wherein the dispensing head is configured to:
translate along a straight direction from the retracted position into the deployed position and vice versa, optionally the preparation unit having an or the ingredient mixing module which comprises a first part and a second part that are relatively movable generally along the straight direction between a mixing position for mixing ingredients and a transfer position for inserting an ingredient and/or removing waste from the mixing module; and/or
move inwards into an outside housing or frame of the main body into the retracted position and outwards of the outside housing or frame into a deployed position.

16. A machine for preparing and dispensing a beverage comprising:
a main body containing a preparation unit for preparing the beverage to be dispensed via an outlet to an external user-recipient at a user-recipient placement location;
a beverage dispensing head that includes the outlet and that is movable relative to the main body inwards into the main body into a retracted head position and outwards from the main body into a deployed head position;
a control unit for controlling the preparation unit to supply the beverage to the outlet; and
the control unit is configured to:
maintain or leave the beverage dispensing head in its retracted position when the preparation unit is not operated to process a liquid, the control unit configured to operate the preparation unit to prepare the beverage when the beverage dispensing head is in its deployed position; and/or
move the beverage dispensing head into its deployed position or maintain or leave it in this position only when the control unit operates the preparation unit to process a liquid for dispensing via the outlet;
wherein the preparation unit has an ingredient mixing module which comprises a first part and a second part that are relatively movable;
wherein the beverage dispensing head is mechanically connected or linked to one of the first and second parts that is movable in the main body so that the dispensing head is moved into:
its deployed position when the first and second parts are relatively moved into the mixing position; and
its retracted position when the first and second parts are relatively moved into the transfer position; and
wherein the beverage dispensing head and the one of the first and second parts are mechanically disconnectable so as to allow a relative movement of the first and second parts without moving the dispensing head.

* * * * *